2,721,177

POLY-OXYALKYLENE GLYCOL LUBRICANT COMPOSITION

Oliver L. Harle, Berkeley, Calif., assignor to California Research Corporation, San Francisco, Calif., a corporation of Delaware No Drawing. Application March 30, 1953,
Serial No. 345,709

6 Claims. (Cl. 252—47.5)

The present invention relates to the preparation of novel and superior lubricating oil compositions. More particularly, the invention has to do with the preparation of polyoxyalkylene glycol lubricating oil compositions having improved stability toward oxidative deterioration.

Polyoxyalkylene glycol materials have hitherto been proposed for use as synthetic lubricants and are rapidly assuming a position of major importance in the lubricant field. These materials are of the type obtained by polymerizing 1,2-alkylene oxides or the corresponding glycols (preferably ethylene oxide or 1,2-propylene oxide) with a suitable reaction initiator such as water, a monohydric alcohol or a glycol, in the presence of catalyst. The resulting polymer materials are polyoxyalkylene glycols having a free hydroxy group at each end of the molecule, or polyoxyalkylene glycols wherein one or both of the terminal hydroxy groups are replaced by alkoxy or acyloxy groups to yield mono- or diethers, mono- or diesters, or ether-esters. Methods for synthesizing these polyoxyalkylene glycols, which comprise the major portion of the lubricant compositions of the present invention, are well known in the art and need not further be described here, reference being made to U. S. Patent Nos. 2,448,664 and 2,457,139, among other patents, for a more complete description of the methods by which these polymeric compounds are prepared.

Although the above-described polyoxyalkylene glycols have certain desirable attributes, they possess a serious drawback of being highly sensitive to oxidative attack. Upon oxidation these polymeric materials depolymerize with consequent loss in viscosity to form undesirable acidic compounds as well as various relatively volatile materials which are rapidly lost from the lubricating system at elevated temperatures. Accordingly, it is an object of this invention to impart oxidative stability to polyoxyalkylene glycols prepared from alkylene oxides or glycols, and particularly from ethylene oxide or 1,2-propylene oxide, or from a mixture of these $C_2$ and $C_3$ oxides. A further object is to prepare novel and superior lubricating oil compositions which are composed in major portion of said polyoxyalkylene glycols and are characterized by a high degree of resistance to oxidative attack.

The invention is predicated on the discovery that polyoxyalkylene glycol materials of the type described above can be made unusually resistant against oxidative attack by incorporating therein a particular combination of additives, one of which is an aromatic diaryl amine or a polyhydroxy aromatic compound and is regarded as the primary inhibitor, while the other is a mercaptan-initiated polyglycol material, which is designated herein as the secondary inhibitor and functions, in a sense, as an activator for the primary inhibitor. The good results obtained by using a combination of these two additives were quite unexpected since the mercaptan-initiated materials have substantially no antioxidant effect on polyoxyalkylene glycol materials when employed alone therein. However, when used conjointly with the aromatic inhibitor, compositions with outstanding resistance against oxidation are obtained.

As indicated above, the primary inhibitor can be an aromatic diaryl amine or a polyhydroxy aromatic compound, or materials from each of said classes can be employed together in a given composition, if desired. Preferably, however, the primary inhibitor comprises an aromatic diaryl amine. More specifically, these amines can be described as compounds of the type having the structural formula

where the R's represent like or different aryl groups such as phenyl, naphthyl, anthryl, or phenanthryl radicals which may be either unsubstituted or substituted on their ring portions by groups such as amino, hydroxyl, mercapto, alkoxy, aryloxy, thioalkyl, aryl, alkaryl and aralkyl radicals. Representative amino compounds which can be successfully employed in a practice of the present invention include phenyl-α-naphthylamine, p-hydroxydiphenylamine, p,p'-di-hydroxy-di-phenylamine, diphenyl-p-phenylenediamine, diphenylamine, phenothiazine, di-β-naphthylamine, p-isopropoxydiphenylamine, di(p-isopropylphenyl)-p-phenylenediamine, di-β-naphthyl-p-phenylenediamine, p,p'-diisooctyldiphenylamine, phenyl-α-anthrylamine and phenyl-α-phenanthrylamine, etc. Other amines of this general variety are also well known in the art.

The polyhydroxy aromatic compounds which can be employed as primary inhibiting compounds are those in which at least two hydroxyl groups appear on one ring, for example hydroquinone, or on one aromatic nucleus, for example, 1,2-dihydroxy-naphthalene. Classes of these compounds are polyhydric phenols, naphthols, anthrols and the like, having a minimum solubility in the polyalkylene glycol polymeric material of 0.25 per cent by weight of the polymeric material and preferably 0.5 per cent. The specific class preferred is a dihydric phenol. Moreover, the polyhydroxy compound can have substituent groups on the aromatic ring or nucleus, such as amino, mercapto, alkoxy, aryloxy, thio, alkyl, aryl, alkaryl, and arylalkyl radicals, so long as there remain at least two free hydroxyl groups on at least one aromatic ring or nucleus, as aforesaid. However, substituent groups containing oxygen which are acidic or acid strengthening in nature, such as nitro, sulfonic acid, and carboxyl radicals which are not further oxidizable, are less desirable and for practical purposes are avoided. Examples of primary inhibiting polyhydroxy aromatic compounds are hydroquinone, t-butylhydroquinone, di-t-butylresorcinol, t-butylcatechol, 1,2-dihydroxynaphthalene, 1,4-dihydroxynaphthalene, 1,2-dihydroxy-4-phenylbenzene, 5-octyl, 1-4-dihydroxynaphthalene, 1,3-dihydroxy - 5 - cetoxybenzene, 1,2-dihydroxythianthrene, 1,2-dihydroxy-4-aminonaphthalene and 1,2 dihydroxy-4-isooctylaminobenzene.

The auxiliary inhibitor additives employed in conjunction with the above primary inhibitors are materials of the type having the general formula

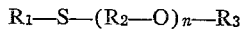

where $R_1$ is an alkyl, cycloalkyl or aralkyl radical, the $R_2$'s are 1,2-alkylene radicals, $R_3$ is a member selected from the group consisting of hydrogen atoms, alkyl radicals and acyl radicals, and $n$ is an integer indicating the number of alkylene oxide monomer units present in the polymer. These compounds are of the type formed by polymerizing a 1,2-alkylene oxide in the presence of a catalyst and with a mercaptan as the reaction initiator. Mercaptan-initiated polyoxyalkylene glycols of this type are known in the art, they being described, for example, in U. S. Patent No. 2,129,709. They are normally prepared by reacting an appreciable excess of an alkylene oxide such as ethylene oxide, 1,2-propylene oxide or 1,2-butylene oxide with a mercaptan such as ethyl mercaptan, butyl mercaptan, amyl mercaptan, heptyl mercaptan, octyl mercaptan, dodecyl mercaptan, cetyl mercaptan, octadecyl mercaptan, cyclohexyl mercaptan, methylcyclohexyl mercaptan, benzyl mercaptan, or the like, in the presence of a catalyst. The reaction goes forward at elevated temperatures of from about 80 to 200° C. and at pressures which preferably are from about 1 to 18 atmospheres. As catalyst there preferably is employed in alkaline material such as caustic soda, sodium carbonate, ammonia, sodium methylate, sodium ethylate, or the like. The polymers formed in this fashion normally have a terminal hydroxy group which can either be left as such or be replaced by suitable alkoxy or acyloxy groups to form the desired ether or ester ytpe of linkage. Thus, the hydroxy group may be replaced by a methoxy, ethoxy, butoxy, 2-ethylhexoxy, phenoxy, or other ether group, or by an acetyl, propionyl, butyryl or other acyl radical.

These mercaptan-initiated polyoxyalkylene glycol additives have molecular weights between about 136 and 3000, depending on the number of carbon atoms in the respective $R_1$, $R_2$ and $R_3$ groups, and on the value of $n$. Further, since these materials are normally obtained in the form of mixtures of varying inetrnal structure and molecular weight, it falls within the purview of this invention to add such polymers either in the form of relatively pure compounds or in the form of a mixture of several such compounds. Accordingly, in referring herein to molecular weight, reference is had either to the molecular weight of a particular mercaptan-initiated polymer or to the average molecular weight of a mixture of such polymers. The preferred mercaptan-initiated polymeric additives comprise mixtures of polymers wherein, in the above structural formula, $R_1$ is an alkyl group of from 1 to 20 carbon atoms, the $R_2$'s represent ethylene or propylene groups, and $R_3$ is a hydrogen atom, an acyl group of a lower ($C_2$–$C_8$) fatty acid, or an alkoxy group of from 1 to 12 carbon atoms, and wherein the polymer mixture has an average molecular weight between about 250 and 2000.

In general, the amount of the primary inhibiting additive required for the substantial inhibition of oxidative deterioration of polyoxyalkylene glycol polymeric material, when employed with a suitable amount of the mercaptan-initiated, seondary inhibitor, is from about 0.1 to 5% by weight of the finished oil, with preferred range being from about 0.2 to 2%. The secondary inhibiting additive is added in an amount sufficient to provide the oil with from about 0.1 to 5% by weight sulfur (i. e., sulfur combined in the polyglycol molecule) and preferably from 0.25 to 2% by weight of such sulfur.

As indicated above, the polyoxyalkylene glycol base materials which comprise the major portion of the lubricant compositions of this invention are prepared by conventional methods. Thus, for example, polyoxypropylene, monohydroxy, monoether materials can be prepared by the addition of 1,2-propylene oxide to a monohydroxy aliphatic alcohol to produce a polymeric mixture of lubricating oil viscosity ranging in molecular weight from about 400 up to 2000 and higher. The preparation of mixed copolymeric polyalkylene oxide materials is also possible, as by reacting both ethylene oxide and 1,2-propylene oxide with a suitable monohydroxy aliphatic alcohol. Preferably employed as the base portion of the present lubricants are the diethers or ether-esters of polyglycols formed from ethylene oxide and/or from 1,2-propylene oxide.

The following examples are illustrative of the procedures which may be employed in forming the secondary, or mercaptan-initiated polyoxyalkylene glycol inhibitors to be added to the conventional alcohol-initiated polyoxyalkylene glycol base fluids.

EXAMPLE I

In this operation 310 grams of n-butyl mercaptan were placed in a suitable steel reactor vessel along with 5.7 grams of sodium methylate. This reactor vessel was connected to a source of 1,2-propylene oxide which was maintained under a constant pressure of 40 p. s. i. with nitrogen. The contents of the reactor vessel were then heated at 115° C. (and under the aforementioned pressure of 40 p. s. i.) for a reaction period of 48 hours, during which time 1600 grams of the propylene oxide were introduced into the reaction mixture. The contents of the reactor vessel were then neutralized with glacial acetic acid, a small amount of xylene being added to break the emulsion and permit separation of the mercaptan-initiated polyglycol material. The latter material was then water-washed, the emulsion produced by said washing being broken by appropriate heating of the mixture. The polyglycol was then dried over anhydrous sodium sulfate and then distilled in vacuo to remove the lighter fractions boiling below 200° C. (pot. temperature) at 1 mm. Hg. As bottoms from this topping operation there were recovered 1691 grams of the desired n-bnutyl mercaptan-initiated polypropylene glycol. This material was found to obtain 4.37% sulfur and had an average molecular weight of approximately 740. It had a viscosity of 144.9 S. S. U. at 100° F. and of 45.9 S. S. U. at 210° F.

EXAMPLE II

The procedure of Example I above was repeated, except that here there were employed 275 grams of tert. bufyl mercaptan, 4.4 grams of sodium methylate and 678 grams of ethylene oxide, and the neutralized and washed reaction product was topped to a pot. temperature of 200° C. at 2.8 mm. Hg. The residue (1227 grams) contained 3.88%, and had a molecular weight of 770, a viscosity at 100° of 219.6 S. S. U. and at 210° F. of 55.1 S. S. U.

EXAMPLE III

In this operation the general procedure of Example I was again employed. Here, however, there were reacted 152 grams of dodecyl mercaptan, 2.2 grams of sodium methylate and 700 grams of 1,2-propylene oxide, the reaction period being extended to 40 hours. There was recovered 764 grams of the desired product boiling above 205° C. at 2 mm. Hg. This product contained 2.53% S and had a molecular weight of about 1270. Its viscosity at 100° F. was 260.8 S. S. U. and at 210° F., 59.5 S. S. U.

Any of the foregoing monothioether products can readily be converted to the corresponding (monothio) diethers or (monothio) ether-esters by conventional methods, as practiced, for example, in conjunction with the polyglycol materials employed as the base fluid in forming the oil compositions of this invention.

A convenient method of measuring the resistance to oxidation possessed by the compositions prepared in accordance with the invention is the use of the apparatus and procedure described in Industrial and Engineering Chemistry, vol. 28, p. 26 (1936), wherein the rate of oxygen absorbed at constant pressure by a definite weight of oil is regarded as a measure of the oxidative stability of the oil. According to this procedure, the oil sample is placed in an absorption cell, provided in the bottom with a fine fritted-glass filter to disperse the oxygen stream, circulating through the system at a constant rate, into fine bubbles. In obtaining the data hereinbelow appearing, the followed modified apparatus and procedure were employed.

The oxidation or absorption cell is constructed of a large glass tube with the head portion having a connection for introducing oxygen, an annular space surrounding the upper end of the tube and a fitting for a removable high speed glass stirrer. The annular space contains potassium hydroxide pellets for the removal of water, carbon dioxide, volatile aldehydes, etc. The lower portion of the cell which contains the tested sample is immersed in an oil bath at a temperature of about 340° F. During the test, the oil sample is rapidly agitated by means of a high-speed stirrer and is kept under a pressure of about 1 atmosphere of pure oxygen, the volume of oxygen added being automatically recorded. The time in hours required for 100 grams of oil to absorb 1200 cc. of oxygen is called the "induction period" (I. P.), and represents the point at which the sample begins to absorb oxygen or oxidize.

The following tabulated data were obtained from a number of experiments performed in accordance with the test above described. In Table I a number of sulfur-containing secondary inhibiting compounds are exemplified in combination with one or the other of the primary inhibiting compounds phenyl-α-naphthylamine and t-butylcatechol, the latter compounds being employed in amounts of 0.25% and 1%, respectively, unless otherwise indicated. The designated secondary inhibiting compounds were used in such amounts as to supply the oil composition with the equivalent of 1% by weight sulfur, except as otherwise indicated. In all instances the polyoxyalkylene glycol polymeric material was one prepared from 1,2-propylene oxide and 2-ethylhexanol, the said polymeric material having an average molecular weight of about 1200. The degree of oxidative stability of each combination appears as the induction period (I. P.) in hours at 340° F.

Table I

OXIDATION RESISTANCE OF INHIBITED POLY-1,2-OXY-PROPYLENE GLYCOL 2-ETHYLHEXYL MONOETHER

[Avg. mol. wt.—1200]

| Example No. | Secondary Inhibitor (1% Sulfur) | Induction Period—Hours at 340° F. | | |
|---|---|---|---|---|
| | | Sec. Inhibitor Alone | Sec. Inhibitor (1% S)+ Phenyl-α-Naphthyl-amine (0.25%) | Sec. Inhibitor (1% S)+ Tert.-Butyl Catechol (1.0%) |
| IV | None | 0.0 | <0.2 | 1.2 |
| V | N-butyl mercaptan-initiated polyoxypropylene glycol (Example I) | 0.0 | 6 | 3.2 |
| VI | Tert.-butyl mercaptan-initiated polyoxyethylene glycol (Example II) | 0.0 | 7 | 2.6 |
| VII | Dodecyl mercaptan-initiated polyoxypropylene glycol (Example III) | 0.0 | 3.5 | 2.6 |
| VIII | Hexadecyl mercaptan-initiated polyoxypropylene glycol (Avg. Mol. Wt. 850) | 0.0 | 8 | 4.1 |
| IX | Benzyl mercaptan-initiated polyoxypropylene glycol (Avg. Mol. Wt. 425) | 0.0 | 4.1 | 3.0 |
| X | N-butyl mercaptan-initiated polyoxypropylene glycol 2-ethylhexyl ether (Avg. Mol. Wt. 1600) | 0.0 | 5 | 3.5 |
| XI | N-butyl mercaptan-initiated polyoxypropylene glycol acetate (Avg. Mol. Wt. 1500) | 0.0 | 6.5 | 3.0 |

Compositions prepared in accordance with the present invention are useful as crankcase lubricants, hydraulic fluids, turbine oils, instrument oils, ice-machine oils, constituent oils in grease manufacture, and the like.

I claim:

1. A lubricant composition comprising a major portion of an aliphatic, monohydric alcohol-initiated poly-1,2-oxyalkylene glycol of lubricating viscosity in which the alkylene groups are selected from the class consisting of ethylene and 1,2 propylene groups, together with from about 0.1 to 5% by weight of a primary inhibitor selected from the class consisting of phenyl-α-naphthylamine and tert.-butylcatechol and an amount, sufficient to provide the lubricant composition with from about 0.25 to 2% by weight sulfur, of a secondary inhibitor having the formula:

$$R_1—S—(R_2—O)_n—R_3$$

wherein $R_1$ is an alkyl group of from 1 to 20 carbon atoms, $R_2$ is an alkylene group selected from the class consisting of ethylene and 1,2-propylene groups, $R_3$ is hydrogen and $n$ is an integer designating the number of alkylene oxide monomer units present, said secondary inhibitor having an average molecular weight between about 250 and 2000.

2. A lubricant composition as described in claim 1 in which the aliphatic monohydric alcohol-initiated poly-1,2-oxyalkylene glycol of lubricating viscosity is a poly-1,2-oxypropylene glycol.

3. A lubricant composition comprising a major portion of an aliphatic, monohydric alcohol-initiated poly-1,2-oxyalkylene glycol of lubricating viscosity in which the alkylene groups are selected from the class consisting of ethylene and 1,2-propylene groups, together with from about 0.1 to 5% by weight of a phenyl-α-naphthylamine primary inhibitor, and an amount sufficient to provide the lubricant composition with from about 0.25 to 2% by weight sulfur, of a secondary inhibitor having the formula:

$$R_1—S—(R_2—O)_n—R_3$$

wherein $R_1$ is an alkyl group of from 1 to 20 carbon atoms, $R_2$ is an ethylene group, $R_3$ is hydrogen and $n$ is an integer designating the number of ethylene oxide monomer units present, said secondary inhibitor having an average molecular weight between about 250 and 2000.

4. A lubricant composition comprising a major portion of an aliphatic, monohydric alcohol-initiated poly-1,2-oxyalkylene glycol of lubricating viscosity in which the alkylene groups are selected from the class consisting of ethylene and 1,2-propylene groups, together with from about 0.1 to 5% by weight of a phenyl-α-naphthylamine primary inhibitor, and an amount, sufficient to provide the lubricant composition with from about 0.25 to 2% by weight sulfur, of a secondary inhibitor having the formula:

$$R_1—S—(R_2—O)_n—R_3$$

wherein $R_1$ is an alkyl group of from 1 to 20 carbon atoms, $R_2$ is a 1,2-propylene group, $R_3$ is hydrogen and $n$ is an integer designating the number of propylene oxide monomer units present, said secondary inhibitor having an average molecular weight between about 250 and 2000.

5. A lubricant composition comprising a major portion of an aliphatic, monohydric alcohol-initiated poly-1,2-oxyalkylene glycol of lubricating viscosity in which the alkylene groups are selected from the class consisting of ethylene and 1,2-propylene groups, together with from about 0.1 to 5% by weight of a tert.-butylcatechol primary inhibitor, and an amount, sufficient to provide the lubricant composition with from about 0.25 to 2% by weight sulfur, of a secondary inhibitor having the formula:

$$R_1—S—(R_2—O)_n—R_3$$

wherein $R_1$ is an alkyl group of from 1 to 20 carbon atoms, $R_2$ is an ethylene group, $R_3$ is hydrogen and $n$ is an integer designating the number of ethylene oxide monomer units present, said secondary inhibitor having an average molecular weight between 250 and 2000.

6. A lubricant composition comprising a major portion of an aliphatic, monohydric alcohol-initiated poly-1,2-oxyalkylene glycol of lubricating viscosity in which the alkylene groups are selected from the class consisting of ethylene and 1,2-propylene groups, together with from about 0.1 to 5% by weight of a tert.-butylcatechol primary inhibitor, and an amount, sufficient to provide the lubricant composition with from about 0.25 to 2% by weight sulfur, of a secondary inhibitor having the formula:

$$R_1\text{—}S\text{—}(R_2\text{—}O)_n\text{—}R_3$$

wherein $R_1$ is an alkyl group of from 1 to 20 carbon atoms, $R_2$ is a 1,2-propylene group, $R_3$ is hydrogen and $n$ is an integer designating the number of 1,2-propylene oxide monomer units present, said secondary inhibitor having an average weight between about 250 and 2000.

References Cited in the file of this patent

UNITED STATES PATENTS

| | | |
|---|---|---|
| 2,491,432 | White | Dec. 13, 1949 |
| 2,570,050 | Eby | Oct. 2, 1951 |

FOREIGN PATENTS

| | | |
|---|---|---|
| 601,419 | Great Britain | May 5, 1948 |

OTHER REFERENCES

"Ind. and Eng. Chem.," vol. 45, No. 7, July 1953, page 1411.